United States Patent
Chun et al.

(10) Patent No.: US 11,867,797 B2
(45) Date of Patent: Jan. 9, 2024

(54) SENSOR CLUSTER DEVICE AND VEHICLE INCLUDING THE SAME

(71) Applicant: HYUNDAI MOBIS CO., LTD., Seoul (KR)

(72) Inventors: Jun Su Chun, Yongin-si (KR); Hee Chang Roh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/842,820

(22) Filed: Jun. 17, 2022

(65) Prior Publication Data

US 2022/0390587 A1 Dec. 8, 2022

Related U.S. Application Data

(63) Continuation of application No. 16/726,902, filed on Dec. 25, 2019, now Pat. No. 11,448,750.

(30) Foreign Application Priority Data

Oct. 25, 2019 (KR) .................. 10-2019-0134009

(51) Int. Cl.
*G01S 13/86* (2006.01)
*G01S 13/931* (2020.01)
*G01S 7/02* (2006.01)

(52) U.S. Cl.
CPC ............ *G01S 13/86* (2013.01); *G01S 13/865* (2013.01); *G01S 13/867* (2013.01); *G01S 13/931* (2013.01); *G01S 7/027* (2021.05)

(58) Field of Classification Search
None
See application file for complete search history.

(56) References Cited

U.S. PATENT DOCUMENTS

| | | |
|---|---|---|
| 6,533,218 B1 | 3/2003 | Jahn |
| 8,838,322 B1 | 9/2014 | Zhu et al. |
| 8,989,944 B1 | 3/2015 | Agarwal et al. |
| 9,628,170 B1 | 4/2017 | Rosenband et al. |

(Continued)

FOREIGN PATENT DOCUMENTS

| | | |
|---|---|---|
| JP | 2019099047 | 6/2019 |
| KR | 10-2018-0084463 | 7/2018 |
| KR | 10-2019-0101926 | 9/2019 |

OTHER PUBLICATIONS

Non-Final Office Action dated Sep. 21, 2021, issued to U.S. Appl. No. 16/726,902.

(Continued)

*Primary Examiner* — Bernarr E Gregory
(74) *Attorney, Agent, or Firm* — H.C. Park & Associates, PLC

(57) ABSTRACT

A sensor cluster device including a radar sensor configured to emit electromagnetic waves onto an object and receive the electromagnetic waves reflected from the object so as to acquire information on the object, a lidar sensor configured to emit laser beams onto the object and receive the laser beams reflected from the object so as to acquire information on the object, a camera sensor configured to capture an image of surroundings of the object and acquire information from the captured image, and an infrared sensor configured to detect heat radiated from peripheral objects in the surroundings of the object to acquire the object and the peripheral objects.

15 Claims, 14 Drawing Sheets

(56) References Cited

U.S. PATENT DOCUMENTS

| | | | | |
|---|---|---|---|---|
| 10,099,630 B1* | 10/2018 | Krishnan | ............... | G01S 13/931 |
| 10,302,744 B1 | 5/2019 | Krishnan et al. | | |
| 11,417,112 B2* | 8/2022 | Kim | ..................... | G01S 13/931 |
| 11,467,284 B2* | 10/2022 | Yamamoto | ............ | G01S 13/867 |
| 11,513,210 B2* | 11/2022 | Chun | ..................... | G01S 13/865 |
| 2014/0247349 A1* | 9/2014 | Heard | ..................... | B60R 11/04 |
| | | | | 348/148 |
| 2017/0364086 A1 | 12/2017 | Williams et al. | | |
| 2018/0348374 A1 | 12/2018 | Laddha et al. | | |
| 2019/0003895 A1* | 1/2019 | Krishnan | ................ | B60R 11/04 |
| 2019/0079532 A1* | 3/2019 | Crawley | ............... | G01S 17/931 |
| 2019/0170544 A1 | 6/2019 | Higashimachi et al. | | |
| 2021/0278840 A1 | 9/2021 | Jaegal | | |

OTHER PUBLICATIONS

Final Office Action dated Jan. 3, 2022, issued to U.S. Appl. No. 16/726,902.

Notice of Allowance dated Feb. 24, 2022, issued to U.S. Appl. No. 16/726,902.

KR Office Action dated Jun. 30, 2023, in KR Application No. 10-2019-0134009.

\* cited by examiner

SENSOR CLUSTER DEVICE AND VEHICLE INCLUDING THE SAME

CROSS-REFERENCE TO RELATED APPLICATIONS

This application is a continuation of U.S. patent application Ser. No. 16/726,902, filed Dec. 25, 2019, now U.S. Pat. No. 11,448,750, which claims priority from and the benefit of Korean Patent Application No. 10-2019-0134009, filed on Oct. 25, 2019, which is hereby incorporated by reference for all purposes as if set forth herein.

BACKGROUND

Field

Exemplary embodiments relate to a sensor cluster device for autonomous driving and more particularly, to a vehicle including the same.

Discussion of the Background

Generally, an autonomous driving system uses GPS position information and signals acquired from various sensors on the basis of road map information to automatically control driving of a vehicle from a start point to an end point on a road or to assist a driver in driving the vehicle, thereby enabling safe driving.

In particular, the autonomous driving system requires assistance of a graphic processing device and a sensor capable of recognizing peripheral objects, so as to recognize, in real time, driving environments of the vehicle that moves at a high speed and determine the recognized driving environments.

Here, the sensor may measure a distance between objects and detect a risk, thereby providing assistance in viewing all areas without a blind spot.

However, since sensors in accordance with the related art are dispersed over a vehicle, there has been a difficulty in installing the sensors. In particular, there has been a difficulty in acquiring accurate information due to a heavy load of collecting the information or performing an arithmetic operation.

The above information disclosed in this Background section is only for enhancement of understanding of the background of the invention and, therefore, it may contain information that does not constitute prior art.

SUMMARY

Exemplary embodiments of the present invention provide a sensor cluster device, in which sensors including a radar, a lidar, a camera, and an infrared camera are mounted on a single device so as to be able to enhance efficiency of installation, particularly, facilitate collection of information, and improve efficiency of an arithmetic operation, thereby enabling acquisition of accurate information, and a vehicle including the sensor cluster device.

Additional features of the invention will be set forth in the description which follows, and in part will be apparent from the description, or may be learned by practice of the invention.

A first exemplary embodiment of the present invention provides a sensor cluster device including: a sensor configured to emit electromagnetic waves onto an object and receive the electromagnetic waves reflected from the object so as to acquire information on the object; a lidar sensor configured to emit laser beams onto the object and receive the laser beams reflected from the object so as to acquire information on the object; a camera sensor configured to capture an image of surroundings of the object and acquire information from the captured image; and an infrared sensor configured to detect heat radiated from peripheral objects in the surroundings of the object to observe the object and the peripheral objects.

The sensor cluster device may further include a body member on which the radar sensor, the lidar sensor, the camera sensor, and the infrared sensor are installed. The body member includes: a body block; a lower block which is provided on a lower portion of one surface of the body block and in which the radar sensor and the lidar sensor are installed; and an upper block which is provided on an upper portion of the one surface of the body block and in which the camera sensor and the infrared sensor are installed.

The body block, the lower block, and the upper block may be integrated with each other.

The lower block and the upper block may be detachably coupled to the body block.

The lower block may include: a lower central part on which the radar sensor is installed; and two lower lateral parts which are respectively provided on both sides of the lower central part, wherein the lidar sensor is installed on each of the two lower lateral parts, and the lidar sensors respectively installed on the two lower lateral parts are installed so that azimuth angles of the lidar sensors overlap each other by a first azimuth angle.

An installation surface of the lower lateral part, on which the lidar sensor is installed, may be provided as an inclined surface, and the two lidar sensors may be spaced apart from each other so that the azimuth angles of the lidar sensors overlap each other by the first azimuth angle.

The sensor cluster device may include a lower angle-adjusting member that allows the lidar sensor to rotate, relative to the lower lateral part, in a direction of the lower central part or in a direction opposite to the lower central part to increase or decrease in first azimuth angle.

An installation surface of the lower central part, on which the radar sensor is installed, may protrude further outward than the installation surface of the lower lateral part, on which the lidar sensor is installed, and the radar sensor may protrude further outward than does the lidar sensor.

The upper block may include: an upper central part on which the camera sensor is installed; and two upper lateral parts which are respectively provided on both sides of the upper central part. The infrared sensor is installed on each of the two upper lateral parts, and the infrared sensors respectively installed on the two upper lateral parts are installed so that azimuth angles of the infrared sensors overlap each other by a second azimuth angle.

An installation surface of the upper lateral part, on which the infrared sensor is installed, may be provided as an inclined surface, and the two infrared sensors may be spaced apart from each other so that the azimuth angles of the infrared sensors overlap each other by the second azimuth angle.

The sensor cluster device may further include an upper angle-adjusting member configured to allow the infrared sensor to rotate, relative to the upper lateral part, in a direction of the upper central part or in a direction opposite to the upper central part to increase or decrease in second azimuth angle.

An installation surface of the upper central part, on which the camera sensor is installed, may be provided to protrude further outward than the installation surface of the upper lateral part, on which the infrared sensor is installed, and the camera sensor may protrude further outward than does the infrared sensor.

The sensor cluster device may further include a cover member configured to accommodate the body member on which the radar sensor, the lidar sensor, the camera sensor, and the infrared sensor are installed, wherein the cover member includes: a case in which an accommodation space with one surface opened is provided to accommodate the body member on which the radar sensor, the lidar sensor, the camera sensor, and the infrared sensor are installed; and a cover which is coupled to the opening of the case.

The body member may be made of a heat dissipation material.

A vehicle may be provided which includes the sensor cluster device and a vehicle body on which the at least one sensor cluster device is installed.

Four of the sensor cluster devices may be provided, and the four sensor cluster devices may be installed on a top surface of the vehicle body so as to be directed toward front, rear, left, and right sides, or installed in both front lateral portions and both rear lateral portions of the vehicle body.

The lidar sensors provided in the two sensor cluster devices corresponding to each other may be installed so that azimuth angles of the lidar sensors overlap each other by a first azimuth angle, and the infrared sensors of the two sensor cluster devices corresponding to each other may be installed so that azimuth angles of the infrared sensors overlap each other by a second azimuth angle.

The radar sensors of the two sensor cluster devices corresponding to each other may be installed so that azimuth angles of the radar sensors overlap each other by a first azimuth angle, and the camera sensors of the two sensor cluster devices corresponding to each other may be installed so that azimuth angles of the camera sensors overlap each other by a second azimuth angle.

The vehicle may include a coupler configured to allow the four sensor cluster devices, which are installed on the top surface of the vehicle body, to rotate to the left or the right directions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
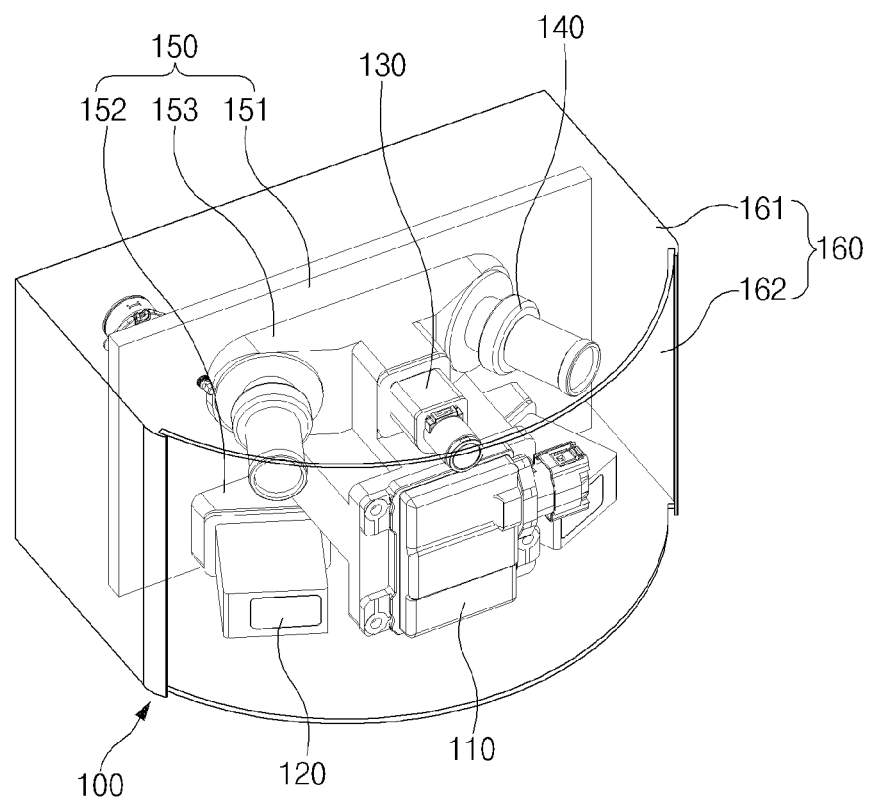
FIG. 1 is a perspective view illustrating a sensor cluster device in accordance with a first exemplary embodiment of the present invention.
Figure 2:
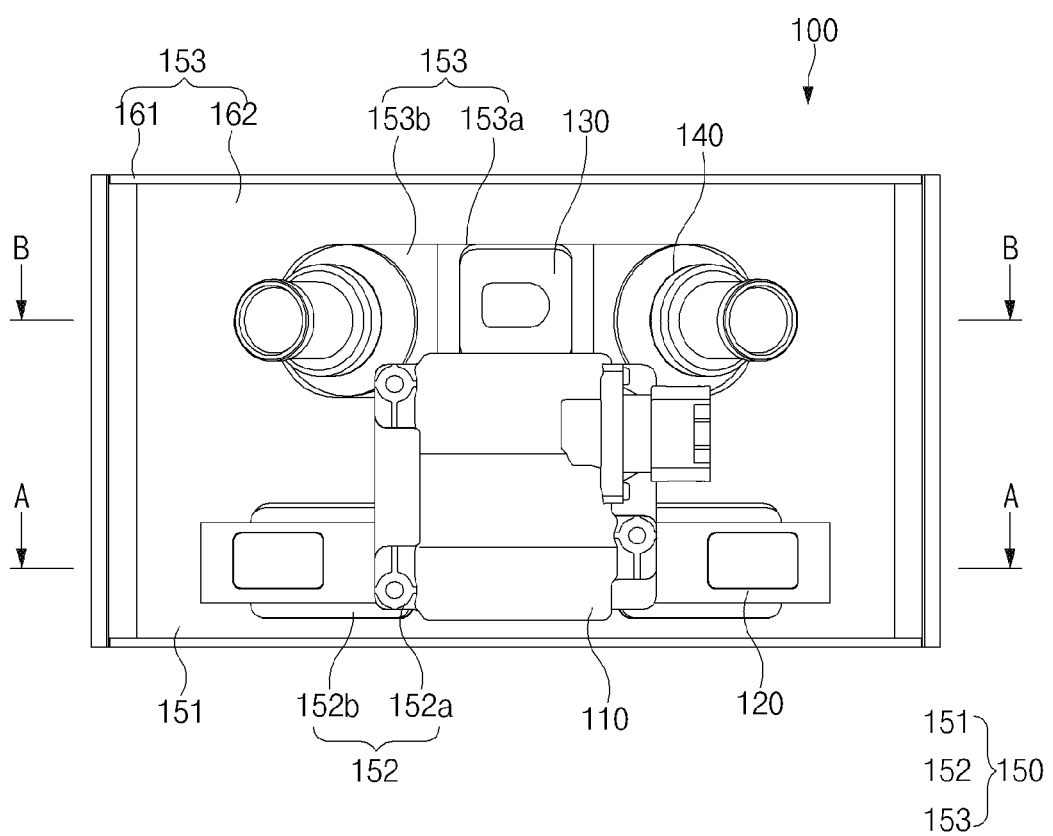
FIG. 2 is a front view of the sensor cluster device of FIG. 1.
Figure 3:
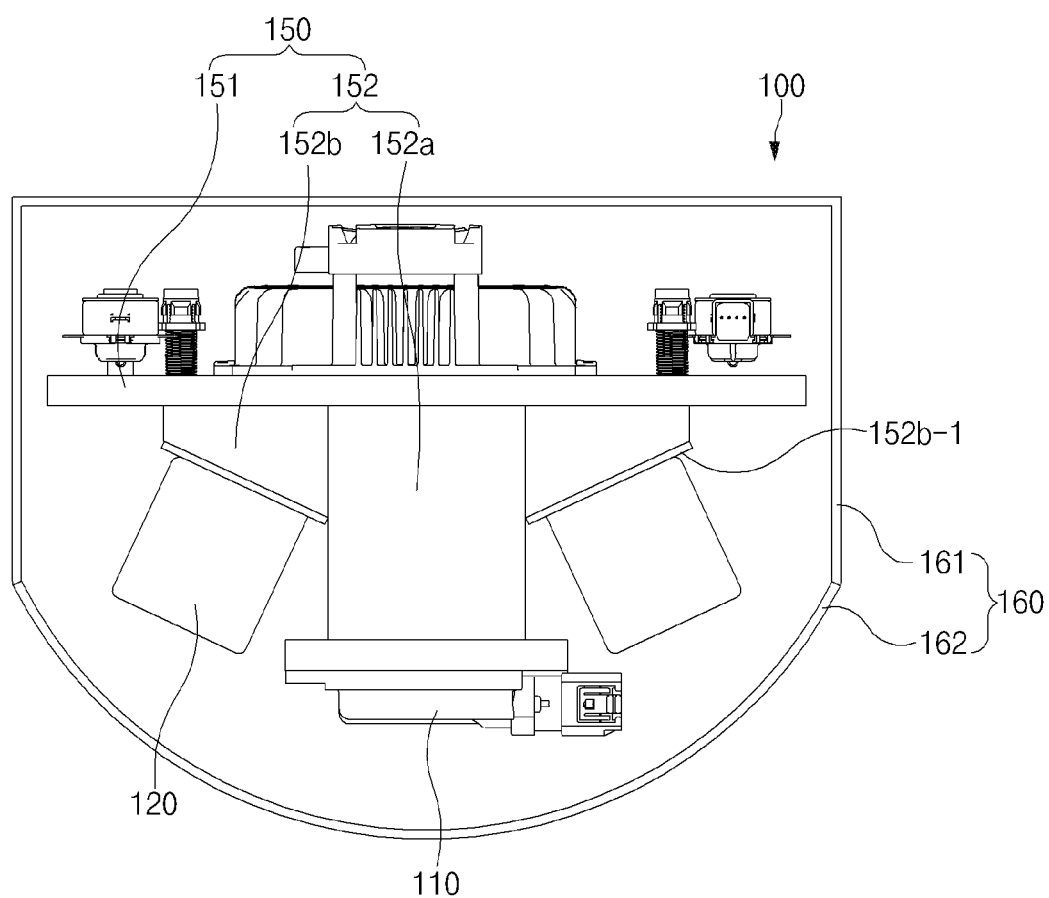
FIG. 3 is a cross-sectional view taken along line A-A' of FIG. 2.
Figure 4:
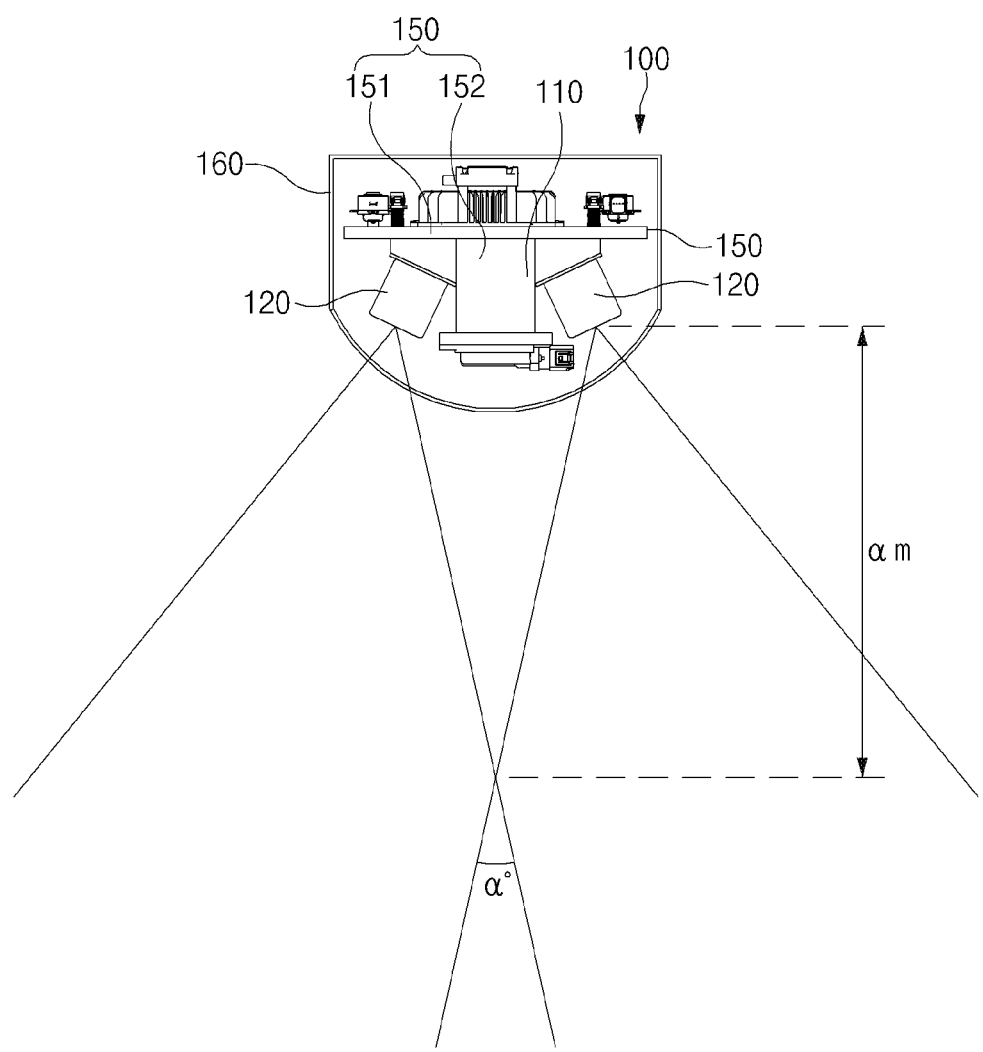
FIG. 4 is a plan view illustrating azimuth angles of lidar sensors in the sensor cluster device in accordance with the first exemplary embodiment of the present invention.
Figure 5:
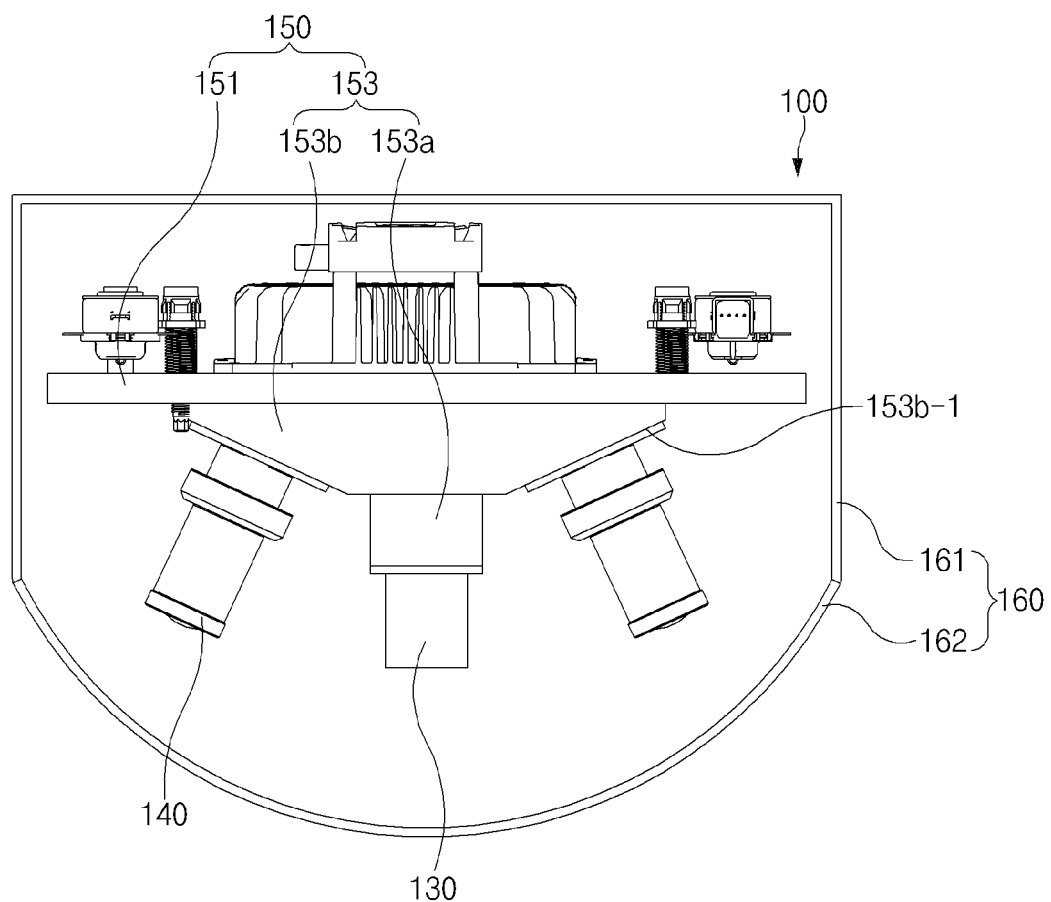
FIG. 5 is a cross-sectional view taken along line B-B' of FIG. 2.
Figure 6:
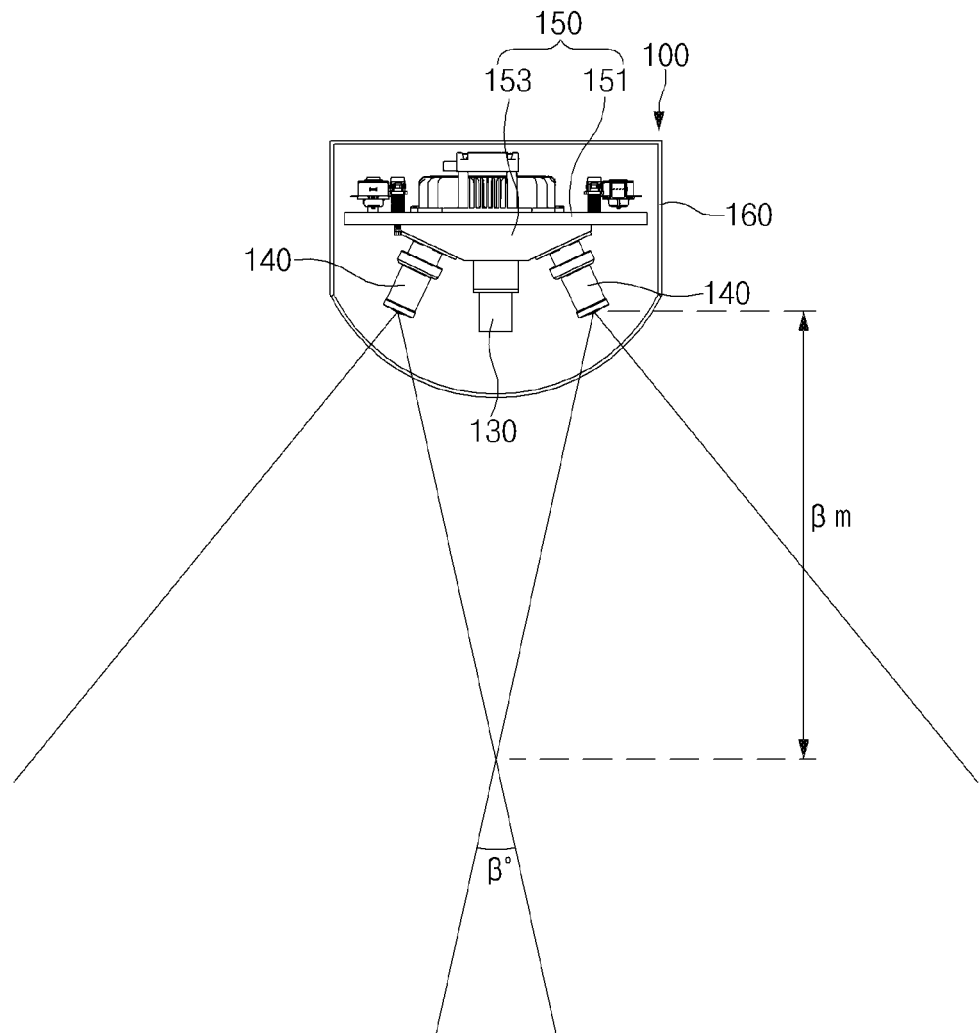
FIG. 6 is a view illustrating azimuth angles of infrared sensors in the sensor cluster device in accordance with the first exemplary embodiment of the present invention.
Figure 7:
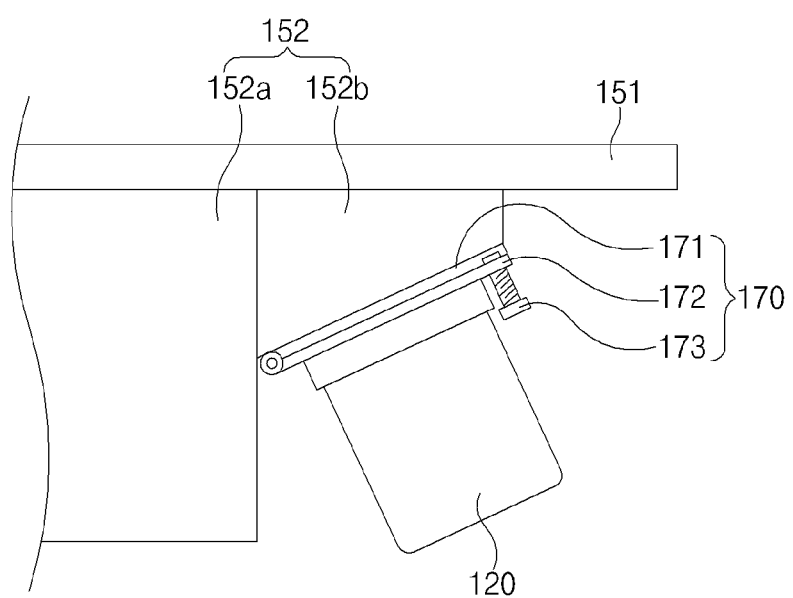
FIG. 7 is a plan view illustrating a lower angle-adjusting member provided in the sensor cluster device in accordance with the first exemplary embodiment of the present invention.
Figure 8:
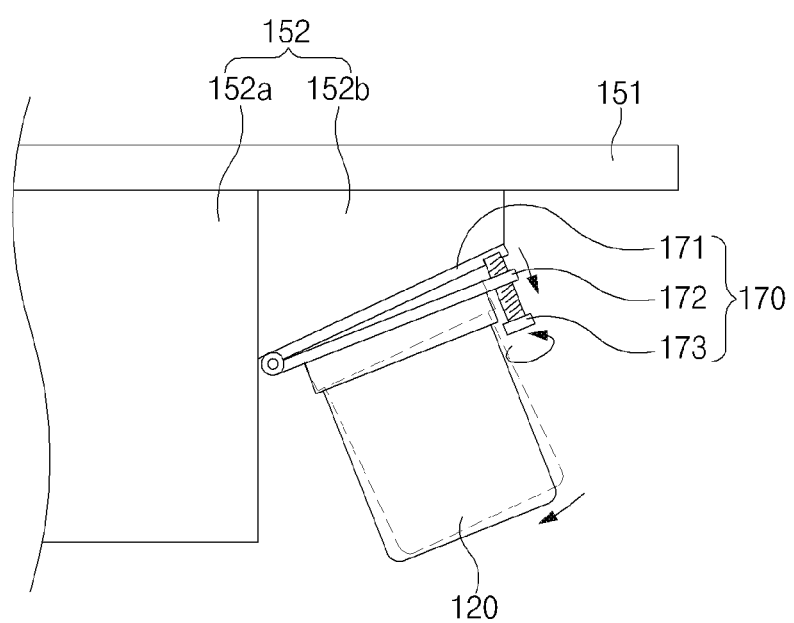
FIG. 8 is a plan view illustrating an operation state of the lower angle-adjusting member.
Figure 9:
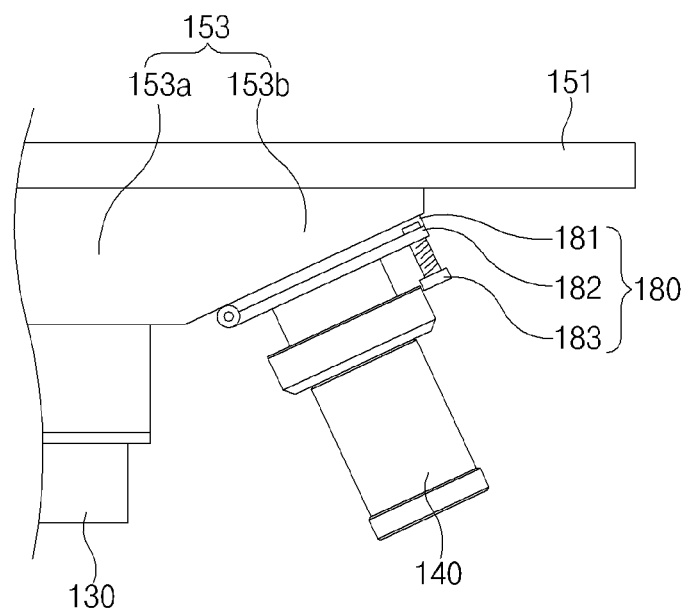
FIG. 9 is a plan view illustrating an upper angle-adjusting member provided in the sensor cluster device in accordance with the first exemplary embodiment of the present invention.
Figure 10:
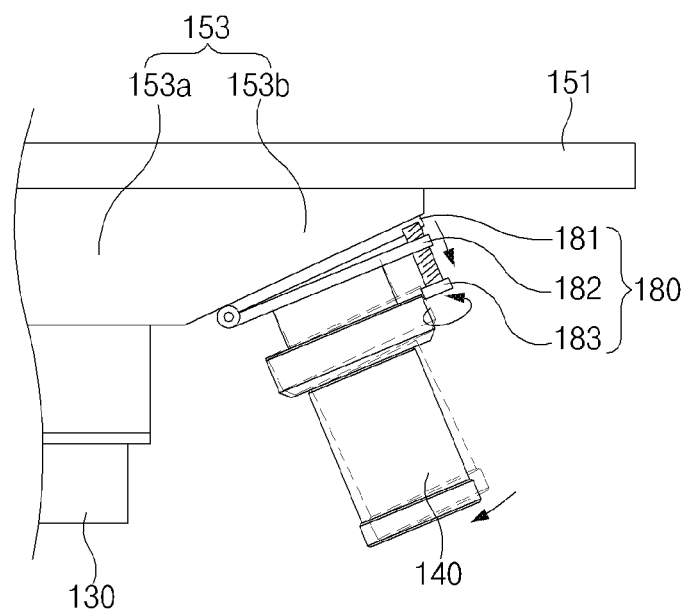
FIG. 10 is a plan view illustrating an operation state of the upper angle-adjusting member.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

A sensor cluster device 100 in accordance with a first exemplary embodiment of the present invention is used to observe driving environments of a subject (for example, a vehicle) moving at a high speed, and includes a radar sensor 110, a lidar sensor 120, a camera sensor 130, and an infrared sensor 140, and a body member 150, as illustrated in FIGS. 1 to 10.

In the sensor cluster device 100 in accordance with a first exemplary embodiment of the present invention, the radar sensor 110, the lidar sensor 120, the camera sensor 130, and the infrared sensor 140 may be integrated into a single device to enhance efficiency of installation, remove a blind spot that is not observed, and particularly, improve accuracy of the observation.

The radar sensor 110 emits electromagnetic waves onto an object and receives the electromagnetic waves reflected from the object so as to acquire information on the object. That is, the radar sensor 110 captures the reflected waves, which are generated when radio waves collide with a target, so as to find existence of the target. For example, there may be an RF signal for the radar sensor 110, and a frequency modulated continuous wave (FMCW) method, a pulse method, or the like may be used as a modulation method for transmitting the RF signal. The FMCW method among the above-described methods is useful to detect a target that is positioned within a short distance, and has excellent reception performance because it is sufficient to merely detect frequencies even when reception sensitivity is weakened with the distance.

The lidar sensor 120 emits laser beams onto an object and receives the laser beams reflected from the object so as to acquire information on the object. That is, the lidar sensor 120 is used as a range measurement sensor when an unmanned vehicle is driven autonomously. For example, while the vehicle moves, the lidar sensor 120 scans, in real time, information on obstacle surfaces and surrounding topography related to a distance range of interest.

The camera sensor 130 captures an image of surroundings of an object and acquires information from the captured image. That is, the camera sensor 130 detects visible light (wavelength: about 380 nm to about 780 nm).

The infrared sensor 140 detects heat radiated from peripheral objects in the surroundings of an object to observe the object and the peripheral objects. That is, the infrared sensor 140 uses infrared light to detect heat (wavelength: about 780 nm to about 1,400 nm) radiated from the object.

Thus, the sensor cluster device 100 in accordance with the first exemplary embodiment of the present invention includes the radar sensor 110, the lidar sensor 120, the camera sensor 130, and the infrared sensor 140, and thus, may stably observe the object and the surroundings of the object irrespective of daytime and nighttime, and a climate and a weather condition. As a result, safety of autonomous driving may be significantly improved. In particular, the radar sensor 110, the lidar sensor 120, the camera sensor 130, and the infrared sensor 140 are packaged into a single device, and thus, efficiency of an arithmetic operation may be improved. As a result, accurate information may be acquired.

Here, the sensor cluster device 100 in accordance with the first embodiment of the present invention further includes a body member 150 on which the radar sensor 110, the lidar sensor 120, the camera sensor 130, and the infrared sensor 140 are installed.

The body member 150 is a member on which the radar sensor 110, the lidar sensor 120, the camera sensor 130, and the infrared sensor 140 are installed. The body member 150 includes a body block 151, a lower block 152, which is provided on a lower portion of one surface of the body block 151 and in which the radar sensor 110 and the lidar sensor 120 are installed, and an upper block 153, which is provided on an upper portion of the one surface of the body block 151 and in which the camera sensor 130 and the infrared sensor 140 are installed.

Here, in the body member 150, the camera sensor 130 and the infrared sensor 140, both of which require wide viewing angles, are disposed at the upper portion of the body block 151. The radar sensor 110 and the lidar sensor 120, both of which require narrower viewing angles than the camera sensor 130 and the infrared sensor 140, are disposed at the lower portion of the body block 151.

The body block 151 has a quadrangular plate shape and includes a fixed unit to be fixed to a cover member 150.

The lower block 152 includes a lower central part 152a on which the radar sensor 110 is installed and two lower lateral parts 152b, which are respectively provided on both sides of the lower central part 152a. The lidar sensor 120 is installed on each of the two lower lateral parts 152b. That is, since the radar sensor 110 has an azimuth angle greater than that of the lidar sensor 120 in the lower block 152, the radar sensor 110 is disposed on a central area, and the lidar sensors 120 are disposed on both sides of the radar sensor 110. For example, one radar sensor 110 is installed on the lower central part 152a of the lower block 152 because the radar sensor 110 is capable of covering an angle range of about 110° or more when mounted on a vehicle, and two lidar sensors 120 are installed on the lower lateral parts 152b of the lower block 152 to cover an angle range of about 110° or more because the lidar sensor 120 is capable of covering an angle range of about 90° when mounted on a vehicle.

Here, the two lidar sensors 120 are installed on the two lower lateral parts 152b so that the azimuth angles of the lidar sensors overlap each other by a first azimuth angle $\alpha°$. In more detail, when the two lidar sensors 120 are mounted on the vehicle, the lidar sensors 120 are installed so that the azimuth angles of the lidar sensors overlap each other by a first azimuth angle $\alpha°$ at a position spaced $\alpha$ m (for example, about 1 m) from a front portion of the vehicle. Accordingly, an object positioned between the two lower lateral parts 152b may be overlappingly observed. As a result, the occurrence of a blind spot, which is not observed by the lidar sensors 120, may be prevented.

That is, the first azimuth angle $\alpha°$, in which the azimuth angles of the two lower lateral parts 152b overlap each other, is set to an angle of about 5° to about 15°, preferably, about 10°. That is, when the first azimuth angle $\alpha°$ is about 5° or less, the azimuth angles of the two lower lateral parts 152b may be spaced apart from each other without overlapping each other due to vibration and impact occurring in the two lower lateral parts 152b, and thus, a blind spot, which is not observed by the lidar sensors 120, may occur. When the first azimuth angle $\alpha°$ is about 15° or more, the first azimuth angle $\alpha°$ may be prevented from disappearing, but more lidar sensors 120 have to be provided to cover an angle range of about 360° in the vehicle. Thus, the first azimuth angle $\alpha°$ is set to an angle of about 5° to about 15°, preferably, about 10°, and thus, the object may be stably observed through the lidar sensors 120.

Here, an installation surface 152b-1 of the lower lateral part 152b, on which the lidar sensor 120 is installed, is provided as an inclined surface, and thus, the two lidar sensors 120 may be spaced a predetermined angle from each other. As a result, the two lidar sensors 120 may be adjusted so that the azimuth angles of the lidar sensors overlap each other by the first azimuth angle $\alpha°$. That is, the installation surfaces 152b-1 of the two lower lateral parts 152b are provided as surfaces inclined in a direction (left and right direction when viewed in FIG. 3) so as not to face each other. Accordingly, the two azimuth angles of the lidar sensors 120 may be adjusted to overlap each other by the first azimuth angle $\alpha°$. For example, when the azimuth angle of the lidar sensor 120 is about 90°, the installation surface 152b-1 of the lower lateral part 152b is inclined at an angle of about 40° relative to the body block 151. Accordingly, the azimuth angles of the two lidar sensors 120 are adjusted to overlap each other by an angle of about 10°.

Here, an installation surface of the lower central part 152a, on which the radar sensor 110 is installed, protrudes further outward than the installation surface of the lower lateral part 152b on which the lidar sensor 120 is installed. Accordingly, the radar sensor 110 protrudes further outward than does the lidar sensor 120, and thus, the azimuth angle of the radar sensor 110 may be stably ensured.

In the lower block 152 having the above-described structure, the radar sensor 110 and the lidar sensor 120 may be stably installed, and particularly, the two lidar sensors 120 may be installed so that the azimuth angles of the lidar sensors overlap each other by the first azimuth angle $\alpha°$.

The upper block 153 includes an upper central part 153a on which the camera sensor 130 is installed and two upper lateral parts 153*b* which are respectively provided on both sides of the upper central part 153*a*. The infrared sensor 140 is installed on each of the two upper lateral parts 153*b*. That is, since the camera sensor 130 has an azimuth angle greater than that of the infrared sensor 140 in the upper block 153, the camera sensor 130 is disposed on a central area, and the infrared sensors 140 are disposed on both sides of the camera sensor 130. For example, one camera sensor is installed on the upper central part 153*a* of the upper block 153 because the camera sensor 130 is capable of covering an angle range of about 110° or more when mounted on a vehicle, and two infrared sensors are installed on the upper lateral parts 153*b* of the upper block 153 to cover an angle range of about 110° or more because the infrared sensor 140 is capable of covering an angle range of about 90° when mounted on a vehicle.

Here, the two infrared sensors 140 are installed on the two upper lateral parts 153*b* so that the azimuth angles of the infrared sensors overlap each other by a second azimuth angle β°. In more detail, when the two infrared sensors 140 are mounted on the vehicle, the infrared sensors 140 are installed so that the azimuth angles of the infrared sensors overlap each other by the second azimuth angle β° at a position spaced β m (for example, about 1 m) from a front portion of the vehicle. Accordingly, an object positioned between the two upper lateral parts 153*b* may be overlappingly observed. As a result, occurrence of a blind spot, which is not observed by the infrared sensors 140, may be prevented.

Here, the second azimuth angle β°, in which the azimuth angles of the upper lateral parts 153*b* overlap each other, is set to an angle of about 5° to about 15°, preferably, about 10°. That is, when the second azimuth angle β° is about 5° or less, the azimuth angles of the two infrared sensors 140 may be spaced apart from each other without overlapping each other due to vibration and impact occurring in the two upper lateral parts 153*b*, and thus, the blind spot, which is not observed by the infrared sensors 140, may occur. When the second azimuth angle (3° is about 15° or more, the second azimuth angle β° may be prevented from disappearing. However, more infrared sensors 140 have to be provided to cover an angle range of about 360° in the vehicle. Thus, the second azimuth angle β° is set to an angle of about 5° to about 15°, preferably, about 10°, and thus the object may be stably observed through the infrared sensors 140.

Here, an installation surface 153*b*-1 of the upper lateral part 153*b*, on which the infrared sensor 140 is installed, is provided as an inclined surface, and thus, the two infrared sensors 140 may be spaced apart from each other so that the azimuth angles of the infrared sensors 140 overlap each other by the second azimuth angle β°. That is, the installation surfaces 153*b*-1 of the two upper lateral parts 153*b* are provided as surfaces inclined in directions so as not to face each other. Accordingly, the two azimuth angles of the infrared sensors 140 may be adjusted to overlap each other by the second azimuth angle β°. As an example, when the azimuth angle of the infrared sensor 140 is about 90°, the installation surface of the upper lateral part 153*b* is inclined at about 40° relative to the body block 151. Accordingly, the azimuth angles of the two infrared sensors 140 may be adjusted to overlap each other by about 10°.

Here, an installation surface of the upper central part 153*a*, on which the camera sensor 130 is installed, protrudes further outward than the installation surface of the upper lateral part 153*b* on which the infrared sensor 140 is installed. Accordingly, the camera sensor 130 protrudes further outward than does the infrared sensor 140, and thus, the azimuth angle of the camera sensor 130 may be stably ensured.

In the upper block 153 having the above-described structure, the camera sensor 130 and the infrared sensor 140 may be stably installed, and particularly, the two infrared sensors 140 may be installed so that the azimuth angles of the infrared sensors overlap each other by the second azimuth angle β°.

Therefore, the body member 150 includes the body block 151, the lower block 152, and the upper block 153, and thus, the radar sensor 110, the lidar sensor 120, the camera sensor 130, and the infrared 140 sensor may be stably installed.

Here, the body member 150 is made of a heat dissipation material, and thus, may stably absorb heat generated from the radar sensor 110, the lidar sensor 120, the camera sensor 130, and the infrared 140 sensor and then discharge the heat to the outside. As a result, temperatures of the radar sensor 110, the lidar sensor 120, the camera sensor 130, and the infrared 140 sensor may be prevented from significantly rising.

Here, the body block 151, the lower block 152, and the upper block 153 are integrated with each other, and thus, ease of manufacture may be improved.

Here, the sensor cluster device 100 in accordance with the first exemplary embodiment of the present invention further includes a cover member 160 that accommodates the body member 150 on which the radar sensor 110, the lidar sensor 120, the camera sensor 130, and the infrared sensor 140 are installed.

The cover member 160 is configured to protect the body member 150 on which the radar sensor 110, the lidar sensor 120, the camera sensor 130, and the infrared sensor 140 are installed. The cover member 150 includes a case 161 and a cover 162. In the case 161, an accommodation space with one surface opened is provided to accommodate the body member 150 on which the radar sensor 110, the lidar sensor 120, the camera sensor 130, and the infrared sensor 140 are installed. The cover 162 is coupled to the opening of the case 161.

Here, the cover 162 is slidably coupled to the case 161 and made of a transparent or translucent material.

Thus, the cover member 160 may stably protect the body member 150 on which the radar sensor 110, the lidar sensor 120, the camera sensor 130, and the infrared sensor 140 are installed. Also, the cover 162 may be provided as a curved surface so as to minimize refraction of light.

Here, the sensor cluster device 100 in accordance with the first exemplary embodiment of the present invention includes a lower angle-adjusting member 170 that adjusts an angle of the lidar sensor 120.

The lower angle-adjusting member 170 allows the lidar sensor 120 to rotate, relative to the lower lateral part 152*b*, in a direction of the lower central part 152*a* or in a direction opposite to the lower central part 152*a* to increase or decrease in first azimuth angle α°. Accordingly, the first azimuth angle α° defined by the two lidar sensors 120 may be adjusted.

For example, the lower angle-adjusting member 170 is provided between the lidar sensor 120 and the lower lateral part 152*b*. The lower angle-adjusting member 170 includes a lower fixed plate 171 and a lower movable plate 172, which have ends (ends of a side adjacent to the lower central part 152*a*) rotatably hinge-coupled to each other, and a lower adjusting bolt 173 that passes through the other end of the lower movable plate 172 and is supported by the other end of the lower fixed plate 171. That is, in the lower angle-adjusting member 170, the lower movable plate 172 moves along threads of the lower adjusting bolt 173 when the lower adjusting bolt 173 rotates. Here, the lower movable plate 172 rotates relative to the one end of the lower fixed plate 171 toward the lower central part 152a, and the lidar sensor 120 rotates toward the lower central part 152a in conjunction with the lower movable plate 172. Accordingly, the first azimuth angle α° overlapping between the two lidar sensors 120 may increase.

Thus, the lower angle-adjusting member 170 may adjust the first azimuth angle α° overlapping between the two lidar sensors 120.

Here, the sensor cluster device 100 in accordance with the first exemplary embodiment of the present invention includes an upper angle-adjusting member 180 that adjusts an angle of the infrared sensor 140.

The upper angle-adjusting member 180 allows the infrared sensor 140 to rotate, relative to the upper lateral part 153b, in a direction of the upper central part 153a or in a direction opposite to the upper central part 153a, and thus, the second azimuth angle β° between the two infrared sensors 140 may increase or decrease.

As an example, the upper angle-adjusting member 180 is provided between the infrared sensor 140 and the upper lateral part 153b. The upper angle-adjusting member 180 includes an upper fixed plate 181 and an upper movable plate 182, which have ends (ends of a side adjacent to the upper central part) rotatably hinge-coupled to each other, and an upper adjusting bolt 183 that passes through the other end of the upper movable plate 182 and is supported by the other end of the upper fixed plate 181. That is, in the upper angle-adjusting member 180, the upper movable plate 182 moves along threads of the upper adjusting bolt 183 when the upper adjusting bolt 183 rotates. Here, the upper movable plate 182 rotates relative to the one end of the upper fixed plate 181 toward the upper central part 153a, and the infrared sensor 140 rotates toward the upper central part 153a by being interlocked with the upper movable plate 182. Accordingly, the second azimuth angle β° between the two infrared sensors 140 may increase.

Thus, the upper angle-adjusting member 180 may adjust the second azimuth angle β° overlapping between the two infrared sensors 140.

The sensor cluster device 100 having the above-described structure in accordance with an exemplary embodiment of the present invention may enhance efficiency of installing the sensors, and particularly, facilitate collection of information to improve efficiency of an arithmetic operation. As a result, accurate information may be acquired.

Hereinafter, in describing another exemplary embodiment in accordance with the present invention, components having the same function as in the foregoing embodiment are given with the same reference numerals, and their duplicated descriptions will be omitted.

Figure 11:
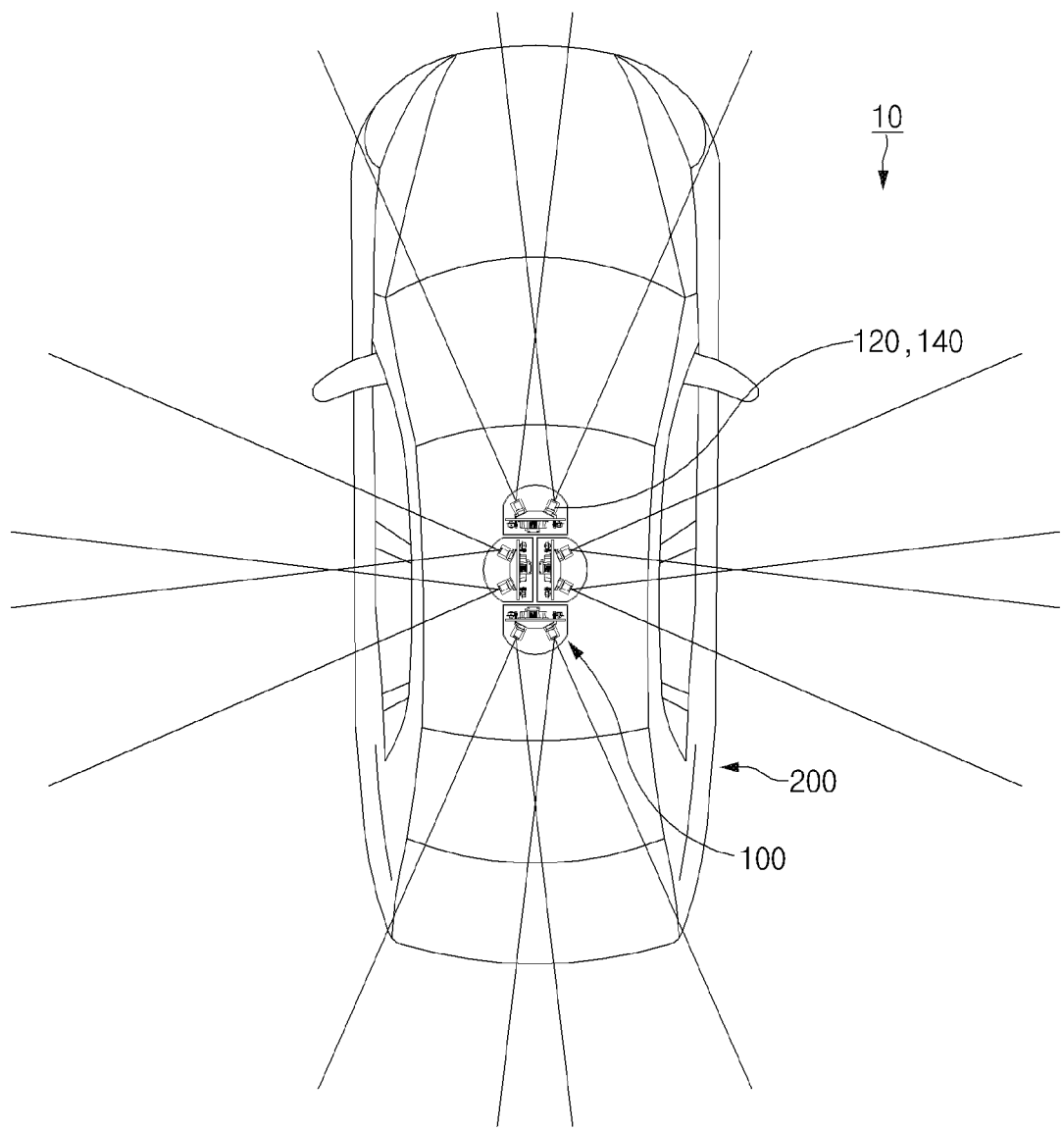
FIG. 11 is a plan view illustrating a first example of a vehicle in accordance with a second exemplary embodiment of the present invention.
Figure 12:
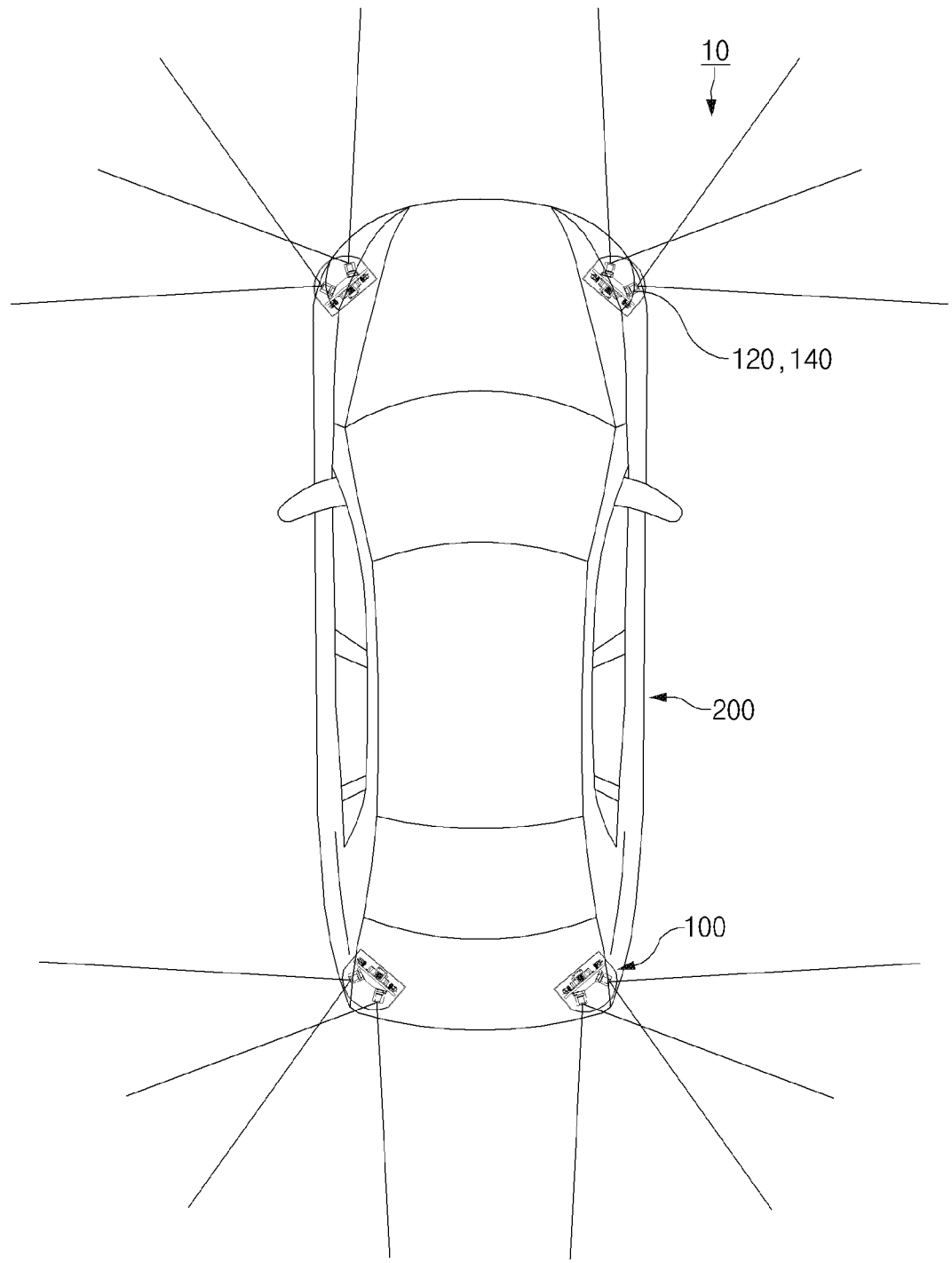
FIG. 12 is a plan view illustrating a second example of a vehicle in accordance with the second exemplary embodiment of the present invention.
Figure 13:
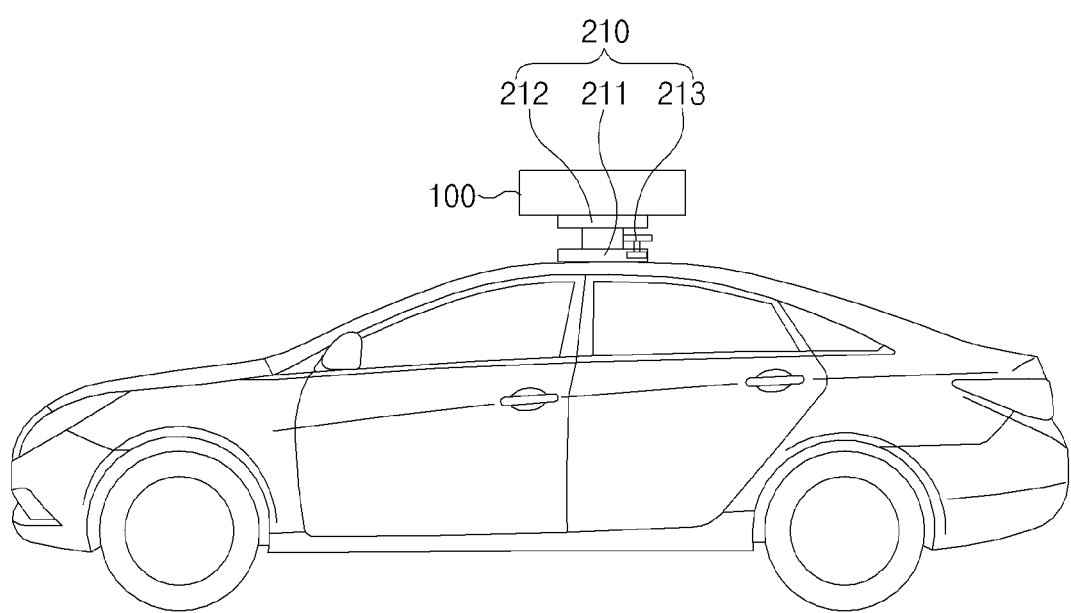
FIG. 13 is a side view illustrating a coupler of the vehicle in accordance with the second exemplary embodiment of the present invention.

A vehicle 10 in accordance with a second exemplary embodiment of the present invention includes a sensor cluster device 100 and a vehicle body 200 on which the at least one sensor cluster device 100 is installed, as illustrated in FIGS. 11 to 13.

Here, the sensor cluster device 100 has the same components and functions as the sensor cluster device in accordance with the first exemplary embodiment described above, and thus, duplicate descriptions will be omitted.

That is, in the vehicle 10 in accordance with the second exemplary embodiment, the sensor cluster device 100, in which a radar sensor 110, a lidar sensor 120, a camera sensor 130, and an infrared sensor 140 are installed, may be mounted on a vehicle body 200 to enhance efficiency of installation and acquire accurate information.

As a first example, when referring to FIG. 11, the vehicle 10 in accordance with the second exemplary embodiment of the present invention includes a four-sensor cluster device 100 and a vehicle body 200. The four-sensor cluster devices 100 are installed, on a top surface of the vehicle body 200, so as to be directed toward front, rear, left, and right sides, respectively. Accordingly, the vehicle 10 may be stably observed in an angle range of about 360°.

As a second example, when referring to FIG. 12, the vehicle 10 in accordance with the second exemplary embodiment of the present invention includes a four sensor cluster devices 100 and a vehicle body 200. The four sensor cluster devices 100 are installed in upper portions, that is, in both front lateral portions and both rear lateral portions of the vehicle body 200. Accordingly, the vehicle 10 may be stably observed in an angle range of about 360°.

Here, in the vehicle 10 in accordance with the second exemplary embodiment of the present invention, the lidar sensors 120 provided in the two sensor cluster devices 100 corresponding to each other are installed so that azimuth angles of the lidar sensors overlap each other by a first azimuth angle α°, and the infrared sensors 140 provided in the two sensor cluster devices 100, which correspond to each other and are installed on the vehicle body 200, are installed so that azimuth angles of the infrared sensors overlap each other by a second azimuth angle β°. Accordingly, the vehicle 10 may be stably observed in an angle range of about 360°.

Here, in the vehicle 10 in accordance with the second exemplary embodiment of the present invention, the radar sensors 110 provided in two sensor cluster devices 100 corresponding to each other are installed so that azimuth angles of the radar sensors overlap each other by the first azimuth angle α°, and the camera sensors 130 provided in the two sensor cluster devices 100 corresponding to each other are installed so that azimuth angles of the camera sensors overlap each other by the second azimuth angle β°. Accordingly, the vehicle 10 may be stably observed in an angle range of about 360°.

Here, when referring to FIG. 13, the vehicle 10 in accordance with the second exemplary embodiment of the present invention includes a coupler 210 that allows the four sensor cluster devices 100, which are installed on the top surface of the vehicle body 200, to rotate in a left or right direction when the four sensor cluster devices 100 are installed in the top surface of the vehicle body 200.

The coupler 210 allows the sensor cluster devices 100 to rotate so that the sensor cluster devices 100 face an object, and thus, the object may be easily observed by the sensor cluster devices 100. As an example, the coupler 210 includes a fixed part 211 that is fixed to the top surface of the vehicle body 200, a rotatable part 212 which is rotatably coupled to the fixed part 211 and on which the four sensor cluster devices 100 are installed, and a driving motor 123 for allowing the rotatable part 212 to rotate in the left or right direction.

Therefore, the vehicle 10 in accordance with the second exemplary embodiment of the present invention may use the coupler 210 so that the four sensor cluster devices 100 rotate stably. Accordingly, the object may be more accurately observed.

Figure 14:
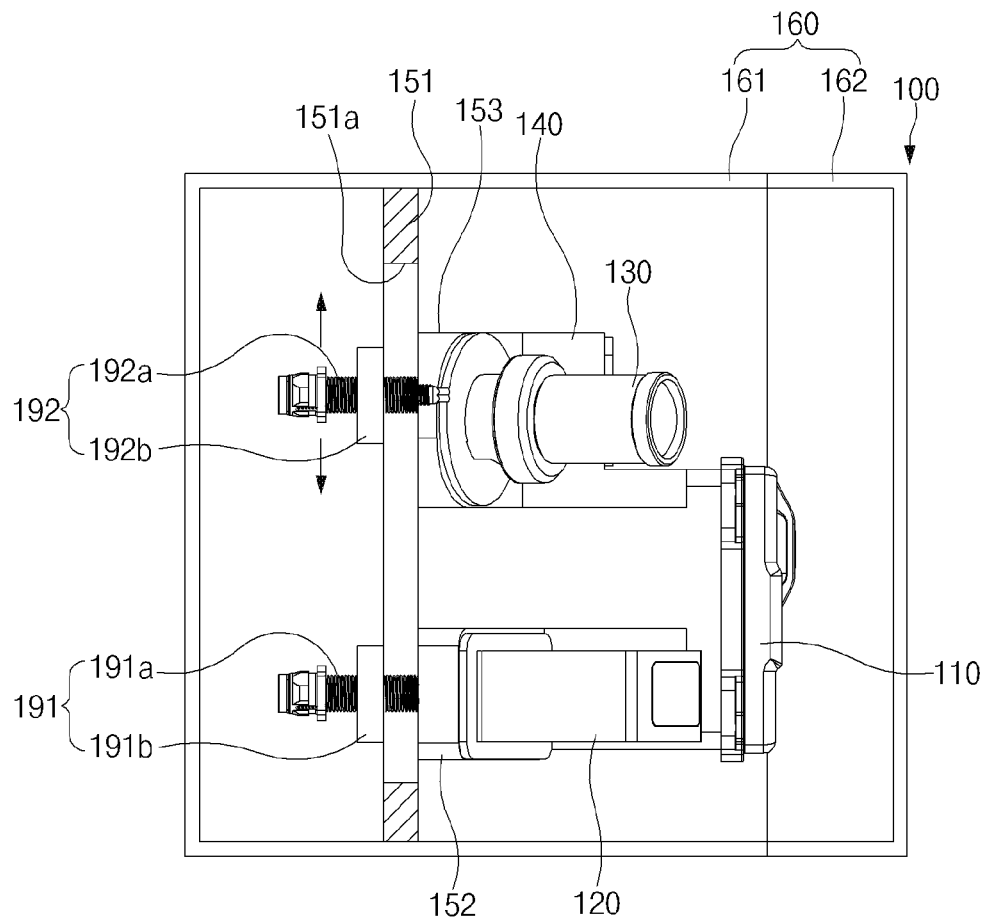
FIG. 14 is a cross-sectional view illustrating a sensor cluster device in accordance with a third exemplary embodiment of the present invention.

A sensor cluster device 100 in accordance with a third exemplary embodiment of the present invention includes a body member 150 that includes a body block 151, a lower block 152, and an upper block 153, as illustrated in FIG. 14.

Here, the lower block 152 and the upper block 153 are detachably coupled to the body block 151, and thus, the radar sensor 110 and the lidar sensor 120 coupled to the lower block 152 and the camera sensor 130 and the infrared sensor 140 coupled to the upper block 153 may be withdrawn to the outside of the cover member 160. As a result, the radar sensor 110, the lidar sensor 120, the camera sensor 130, and the infrared sensor 140 may be easily replaced.

Here, the sensor cluster device 100 in accordance with the third exemplary embodiment of the present invention includes a lower height-adjusting member 191 and an upper height-adjusting member 192 that respectively adjust heights of the lower block 152 and the upper block 153, which are coupled to the body block 151.

The lower height-adjusting member 191 includes a guide hole 151*a* which is vertically defined in a surface of the body block 151, a lower adjusting shaft 191*a* which is provided on the lower block 152 and passes through the guide hole 151*a*, and a lower adjusting nut 191*b* which is coupled to the lower adjusting shaft 191*a* passing through the guide hole 151*a* to fix the lower block 152 to the body block 151.

The upper height-adjusting member 192 includes an upper adjusting shaft 192*a*, which passes through the guide hole 151*a* vertically defined in the surface of the body block 151, and an upper adjusting nut 192*b* which is coupled to the upper adjusting shaft 192*a* passing through the guide hole 151*a* to fix the upper block 153 to the body block 151.

Therefore, the sensor cluster device 100 in accordance with the third exemplary embodiment of the present invention may include the lower height-adjusting member 191 and the upper height-adjusting member 192 and thus, may adjust the heights of the lower block 152 and the upper block 153. Accordingly, the heights of the radar sensor 110, the lidar sensor 120, the camera sensor 130, and the infrared sensor 140 may be adjusted.

The sensor cluster device 100 in accordance with the present invention may include the radar sensor 110, the lidar sensor 120, the camera sensor 130, and the infrared sensor 140 to enhance the efficiency of installation, particularly, facilitate the collection of information, and improve the efficiency of the arithmetic operation. As a result, accurate information may be acquired.

Also, the sensor cluster device 100 in accordance with the present invention may include the body member 150 on which the radar sensor 110, the lidar sensor 120, the camera sensor 130, and the infrared sensor 140 are mounted, and thus, the sensor cluster device 100 may be manufactured to be compact in size. As a result, the efficiency of installation may be enhanced. In particular, the body member 150 may include the body block 151, the lower block 152 on which the radar sensor 110 and the lidar sensor 120 are disposed, and the upper block 153 on which the camera sensor 130 and the infrared sensor 140 are disposed. Accordingly, the sensors may be stably installed, and the azimuth angles of the sensors may be stably ensured.

Also, in the sensor cluster device 100 in accordance with the present invention, the body block 151, the lower block 152, and the upper block 153 may be integrated with each other, and thus, the efficiency of manufacture may be significantly enhanced. Here, in the sensor cluster device 100 in accordance with the present invention, the body block 151, the lower block 152, and the upper block 153 may be detachably coupled to each other, and thus, the sensors may be easily installed or replaced.

Also, in the sensor cluster device 100 in accordance with the present invention, the lower block 152 may include the lower central part 152*a* and the two lower lateral parts 152*b*, and thus the azimuth angles of the lidar sensor 152 and the lidar sensor may be stably ensured. In particular, the lidar sensors 120, which are installed on the two lower lateral parts 152*b*, are installed so that the azimuth angles of the lidar sensors 120 overlap each other by the first azimuth angle α°, and thus the blind spot that is not observed by the lidar sensors 120 may be removed. As a result, accurate information may be acquired.

Also, in the sensor cluster device 100 in accordance with the present invention, the installation surface of the lower lateral part 152*b* may have the inclined surface, and thus, the two lidar sensors 120 may be installed so that the azimuth angles of the lidar sensors 120 overlap each other by the first azimuth angle α°.

In particular, the sensor cluster device 100 in accordance with the present invention may include the lower angle-adjusting member 170 that allows the two lidar sensors 120 to rotate toward the lower central part 152*a*, and thus the two lidar sensors 120 may be adjusted so that the azimuth angles of the lidar sensors 120 overlap each other by the first azimuth angle α°.

Also, in the sensor cluster device 100 in accordance with the present invention, the upper block 153 may include the upper central part 153*a* and the two upper lateral parts 153*b*, and thus the azimuth angles of the camera sensor 130 and the infrared sensor 140 may be stably ensured. Particularly, the two infrared sensors 140, which are installed on the upper lateral parts 153*b*, are installed so that the azimuth angles of the infrared sensors 140 overlap each other by the second azimuth angle β°, and thus the blind spot that is not observed by the infrared sensors may be removed. As a result, the accurate information may be acquired.

Also, in the sensor cluster device in accordance with the present invention, the installation surface of the upper lateral part, on which the infrared sensor is installed, may be provided as the inclined surface, and thus the two infrared sensors may be installed so that the azimuth angles of the infrared sensors overlap each other by the second azimuth β° angle.

In particular, the sensor cluster device in accordance with the present invention may include the upper angle-adjusting member that allows the infrared sensor to rotate toward the upper central part 153*a*, and thus the two infrared sensors 140 may be adjusted so that the azimuth angles of the infrared sensors 140 overlap each other by the second azimuth angle β°.

Here, the vehicle in accordance with the present invention may include the sensor cluster device 100 and the vehicle body 200. The four sensor cluster devices 100 are installed, on the top surface of the vehicle body 200, so as to be directed toward front, rear, left, and right sides, respectively. Alternatively, the four sensor cluster devices 100 are installed in both the front lateral portions and both the rear lateral portions of the vehicle body 200. Accordingly, the observation may be performed in the angle range of about 360° with respect to the vehicle body 200.

In particular, in the vehicle in accordance with the present invention, the lidar sensors 120 provided in the two sensor cluster devices 100 corresponding to each other may be installed so that the azimuth angles of the lidar sensors 120 overlap each other by the first azimuth angle, and the infrared sensors 140 of the two sensor cluster devices 100 corresponding to each other are installed so that the azimuth angles of the infrared sensors 140 overlap each other by the second azimuth angle β°. Accordingly, the blind spot that is not observed may be removed, and thus, accurate information may be acquired.

Also, in the vehicle in accordance with the present invention, the radar sensors 140 provided in the two sensor cluster devices 100 corresponding to each other are installed so that the azimuth angles of the radar sensors 110 overlap each other by the first azimuth angle α°, and the camera sensors 130 of the two sensor cluster devices corresponding to each other are installed so that the azimuth angles of the camera sensors 130 overlap each other by the second azimuth angle β°. Accordingly, the blind spot that is not observed may be removed, and thus, accurate information may be acquired.

Also, in the vehicle in accordance with the present invention, when the four sensor cluster devices 100 are provided on the top surface of the vehicle body 200, the four sensor cluster devices 100 are installed through the coupler 210. Accordingly, the sensor cluster devices 100 may be allowed to rotate left or right with respect to the vehicle body 200, and thus, the object may be more effectively observed.

The scope of the present invention is defined by the appended claims rather than the detailed descriptions, and it is possible to make various embodiments derived from the meaning and scope of the claims and their equivalents concept.

What is claimed is:

1. A sensor cluster device comprising:
   a radar sensor configured to acquire information concerning an object by emitting electromagnetic waves onto an object and receiving the electromagnetic waves reflected from the object;
   one or more lidar sensors configured to acquire information concerning an object by emitting laser beams onto the object and receiving the laser beams reflected from the object;
   a camera sensor configured to capture an image of surroundings of the object;
   one or more infrared sensors configured to detect heat radiated from peripheral objects in the surroundings of the object to observe the object and the peripheral objects;
   a body member on which the radar sensor, the lidar sensor, the camera sensor, and the infrared sensor are installed; and
   a cover member configured to accommodate the body member,
   wherein the body member comprises:
     a body block;
     a lower block provided on a lower portion of one surface of the body block and in which the radar sensor and the lidar sensor are installed; and
     an upper block provided on an upper portion of the one surface of the body block and in which the camera sensor and the infrared sensor are installed.

2. The sensor cluster device of claim 1, wherein the body block, the lower block, and the upper block are integrated with each other.

3. The sensor cluster device of claim 1, wherein the lower block and the upper block are detachably coupled to the body block.

4. The sensor cluster device of claim 1, wherein the lower block comprises:
   a lower central part on which the radar sensor is installed; and
   two lower lateral parts which are respectively provided on both sides of the lower central part,
   wherein a pair of the lidar sensors are provided, and are installed on each of the two lower lateral parts, and the lidar sensors respectively installed on the two lower lateral parts are installed so that azimuth angles of the lidar sensors overlap each other by a first azimuth overlap angle.

5. The sensor cluster device of claim 4, wherein an installation surface of each of the lower lateral parts, on which each of the lidar sensors is installed, is provided as an inclined surface, and the lidar sensors are spaced apart from each other so that the azimuth angles of the lidar sensors overlap each other by the first azimuth overlap angle.

6. The sensor cluster device of claim 5, comprising a lower angle-adjusting member that allows each of the lidar sensors to rotate, relative to the lower lateral parts, in a direction of the lower central part or in a direction opposite to the lower central part to increase or decrease the first azimuth overlap angle.

7. The sensor cluster device of claim 1, wherein:
   an installation surface of the lower central part, on which the radar sensor is installed, protrudes further outward than the installation surface of each of the lower lateral parts, on which each of the lidar sensors is installed; and
   the radar sensor protrudes further outward than does each of the lidar sensors.

8. The sensor cluster device of claim 1, wherein:
   the upper block comprises:
     an upper central part on which the camera sensor is installed; and
     two upper lateral parts which are respectively provided on both sides of the upper central part; and
   a pair of the infrared sensors are provided, and are installed on each of the two upper lateral parts, and the infrared sensors respectively installed on the two upper lateral parts are installed so that azimuth angles of the infrared sensors overlap each other by a second azimuth overlap angle.

9. The sensor cluster device of claim 8, wherein an installation surface of each of the upper lateral parts, on which each of the infrared sensors is installed, is provided as an inclined surface, and the two infrared sensors are spaced apart from each other so that the azimuth angles of the infrared sensors overlap each other by the second azimuth overlap angle.

10. The sensor cluster device of claim 8, further comprising an upper angle-adjusting member configured to allow each of the infrared sensors to rotate, relative to the upper lateral parts, in a direction of the upper central part or in a direction opposite to the upper central part, to increase or decrease the second azimuth overlap angle.

11. The sensor cluster device of claim 8, wherein:
   an installation surface of the upper central part, on which the camera sensor is installed, is provided to protrude further outward than the installation surface of each of the upper lateral parts, on which each of the infrared sensors is installed; and
   the camera sensor protrudes further outward than does each of the infrared sensors.

12. The sensor cluster device of claim 1, wherein the cover member comprises:
   a case in which an accommodation space with one surface opened is provided to accommodate the body member on which the radar sensor, the one or more lidar sensors, the camera sensor, and the one or more infrared sensors are installed; and
   a cover coupled to the opening of the case.

13. A vehicle comprising:
   one or more sensor cluster devices; and a vehicle body on which the one or more sensor cluster devices is installed, wherein the one or more sensor cluster device comprises:
a radar sensor configured to acquire information concerning an object by emitting electromagnetic waves onto an object and receiving the electromagnetic waves reflected from the object;
one or more lidar sensors configured to acquire information concerning an object by emitting laser beams onto the object and receiving the laser beams reflected from the object;
a camera sensor configured to capture an image of surroundings of the object;
one or more infrared sensors configured to detect heat radiated from peripheral objects in the surroundings of the object to observe the object and the peripheral objects;
a body member on which the radar sensor, the one or more lidar sensors, the camera sensor, and the one or more infrared sensors are installed; and
a cover member configured to accommodate the body member,
wherein four of the sensor cluster devices are provided, and are installed on a top surface of the vehicle body so as to be directed toward front, rear, left, and right sides, or are installed in both front lateral portions and both rear lateral portions of the vehicle body.

14. The vehicle of claim 13, wherein:
a pair of the lidar sensors are provided in each of the sensor cluster devices and are installed so that azimuth angles of the lidar sensors overlap each other by a first azimuth overlap angle; and
a pair of the infrared sensors are provided in each of the sensor cluster devices and are installed so that azimuth angles of the infrared sensors overlap each other by a second azimuth overlap angle.

15. The vehicle of claim 13, comprising a coupler configured to allow the four sensor cluster devices, which are installed on the top surface of the vehicle body, to rotate in left or right directions.

* * * * *